United States Patent
Rhodes

(10) Patent No.: US 7,925,078 B2
(45) Date of Patent: *Apr. 12, 2011

(54) USE OF RAY TRACING FOR GENERATING IMAGES FOR AUTO-STEREO DISPLAYS

(75) Inventor: Charles C. Rhodes, Los Altos, CA (US)

(73) Assignee: Graphics Properties Holdings, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/752,973

(22) Filed: Apr. 1, 2010

(65) Prior Publication Data

US 2010/0188481 A1      Jul. 29, 2010

Related U.S. Application Data

(62) Division of application No. 11/321,253, filed on Dec. 29, 2005, now Pat. No. 7,697,751.

(51) Int. Cl.
  *G06K 9/00* (2006.01)
  *G06K 9/36* (2006.01)
  *G09G 5/00* (2006.01)
(52) U.S. Cl. ........ 382/154; 382/284; 345/419; 345/629
(58) Field of Classification Search .................. 382/100, 382/154, 164–165, 284; 345/419–420, 629
  See application file for complete search history.

(56) References Cited

U.S. PATENT DOCUMENTS

| 6,297,799 | B1 | 10/2001 | Knittel et al. |
| 6,414,681 | B1 | 7/2002 | Ohshima et al. |
| 6,501,471 | B1 | 12/2002 | Venkataraman et al. |
| 6,690,369 | B1 | 2/2004 | Smith et al. |
| 7,088,361 | B2 | 8/2006 | Boekhorst |
| 7,333,107 | B2 * | 2/2008 | Papageorgiou ............... 345/424 |
| 7,439,973 | B2 | 10/2008 | Fossum et al. |
| 7,697,751 | B2 | 4/2010 | Rhodes |
| 2004/0051920 | A1 | 3/2004 | Cameron |
| 2004/0169919 | A1 | 9/2004 | Uehara et al. |
| 2005/0078368 | A1 | 4/2005 | Racette et al. |
| 2006/0082574 | A1 | 4/2006 | Tsubaki |

OTHER PUBLICATIONS

Es, A. and Işler, V., "GPU Based Real Time Stereoscopic Ray Tracing," 22$^{nd}$ International Symposium on Computer and Information Sciences (ISCIS 2007), 7 pages, (2007).

Foley, J.D., et al., "Computer Graphics: Principles and Practice," pp. xv-xxiii; 616-617, 701-715, 753, 776-793, 804-806, 910-916, and 1153-1174; Second Edition; Addison-Wesley Publishing Company, New York, United States (1996).

Hubbold, R.J., et al., "Stereoscopic Volume Rendering," Visualization in Scientific Computing 98:105-115, England (1998).

(Continued)

*Primary Examiner* — Daniel G Mariam
(74) *Attorney, Agent, or Firm* — Sterne, Kessler, Goldstein & Fox PLLC

(57) ABSTRACT

Methods and apparatus for generating composite images for displays are provided. For some embodiments, ray tracing algorithms may be utilized to efficiently generate a composite image corresponding to multiple views. Because ray tracing is done on a per pixel basis, it is possible to generate pixel values for only those pixels that will be allocated to a particular image view. By tracing rays from a viewpoint only through those pixels allocated to displaying images corresponding to that viewpoint, a composite image may be generated without discarding pixel data.

20 Claims, 10 Drawing Sheets

OTHER PUBLICATIONS

Kaufmann, et al., "3D Images Compression for Multi-View Auto-Stereoscopic Displays," 2006 International Conference on Computer Graphics, Imaging and Visualization, Jul. 26-28, pp. 128-136, (2006).

* cited by examiner

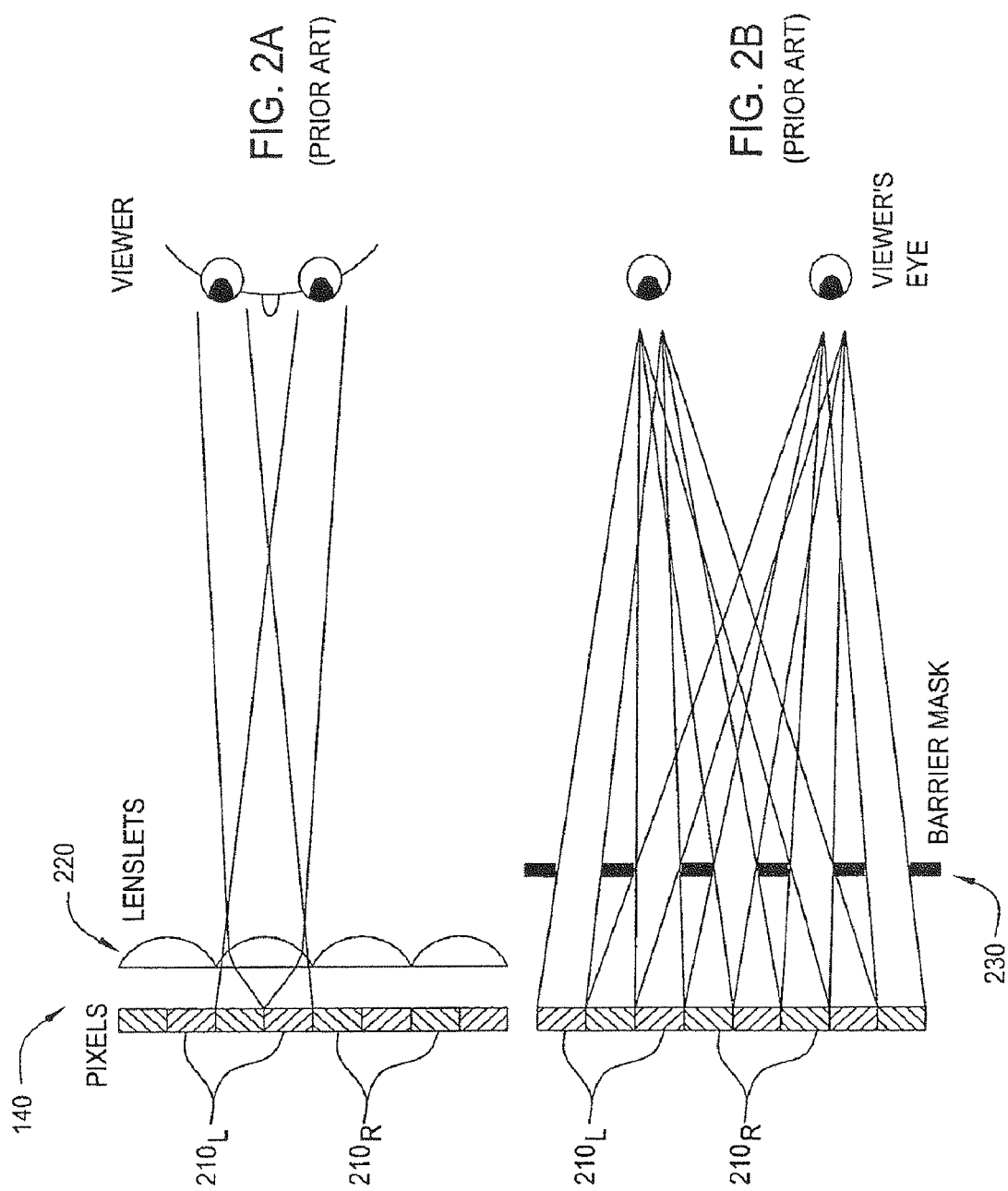

USE OF RAY TRACING FOR GENERATING IMAGES FOR AUTO-STEREO DISPLAYS

BACKGROUND OF THE INVENTION

1. Field of the Invention

Embodiments of the present invention generally relate to display technologies and, more particularly, to the use of ray tracing for generating images for auto-stereo displays.

2. Description of the Related Art

Humans perceive three dimensional (3D) properties, such as depth, by processing slight differences between the images viewed by each eye. These differences result from the different location of each eye and give rise to a phenomenon known as stereo parallax. As an example, a portion of a first object in a scene may be blocked (occluded) by a second object when viewed by the left eye, but the same portion may be visible when viewed by the right eye. Movement parallax is a similar phenomenon that results in different images when a viewer rotates his head or otherwise changes the eyes viewing positions.

In an effort to make computer-generated graphics displayed on two dimensional (2D) displays seem more realistic to the viewer, development efforts have gone into stereo displays that are capable of presenting different images to each eye to simulate the effects of stereo and/or movement parallax. In some cases, these effects may be simulated using a special headset or goggles that include a separate display for each eye. However, some users find such headgear to be uncomfortable or restrictive, for example, by limiting the capability of users to otherwise interact with the viewing environment. As an alternative to such headgear, techniques to display stereo images on more conventional display devices, generally referred to herein as auto-stereo displays, have been developed.

FIGS. 1A-1B illustrate, conceptually, how a stereo image of a scene 100 of objects 110A-110C may be generated and displayed on a display device 140. Referring first to FIG. 1A, a stereo pair of images may be created by generating an image from each of two different points of view, conceptually captured by cameras 120L and 120R, with a separation analogous to those of the eyes 152L and 152R of a viewer 150. As previously described, differences in the different images, such as the amount of object 110A that is visible (or blocked by object 110B)

The separate images may then be combined, for example, by some type of processing logic 130, to generate a composite image to be displayed on the device 140. As illustrated in FIG. 1B, this concept may be expanded to capture images from more points of view, for example, to display multiple stereo images (each from a different viewpoint), which may allow the effects of movement parallax to be simulated. In either case, some percentage of the total display area of the device 140 may be allocated to each image.

For example, as illustrated in FIGS. 2A and 2B, to display a single view stereo image, a first set of pixel rows 210L may be allocated to display an image corresponding to the left eye, while an interleaved second set of pixel rows 210R may be allocated to simultaneously display an image corresponding to the right eye. Such displays typically utilize some type of mechanism to ensure only the appropriate image portion of the screen is visible to each eye. For example, as illustrated in FIG. 2A, a set of lenses 220 may be arranged to ensure that pixel regions 210L are only visible to the left eye, while pixel regions 210R are only visible to the right eye. Alternatively, as illustrated in FIG. 2B, a barrier mask 230 may be utilized. As still another alternative, some type of active shuttering mechanism may be utilized.

In a typical computer system, the scene 100 may actually be stored in a 3D image file, for example, as a collection of polygons (e.g., triangles) used to represent the objects 110 therein. Multiple image views (e.g., one or more stereo pairs) may then be generated by rendering images of the scene from each of the corresponding different viewpoints during a process referred to as rasterization. Rasterization generally involves determining, for each polygon, which pixels are covered by the polygon and, if the corresponding object is closer to the viewer than any other object in the scene, writing a corresponding color to that pixel value. The multiple views may then be assembled to generate a single composite image to be displayed on the device 140.

FIG. 3 illustrates operations 300 of a conventional algorithm, for example, that may be performed by a conventional processing system utilizing one or more central processing units (CPUs) and/or graphics processing units (GPUs), for generating a composite image from multiple views. At step 302, a loop of operations, to be performed for each of the views is entered. At step 303, the scene data is fetched and, at step 304, an image is generated for a current view. These steps are repeated for each viewpoint. Once the last image has been rendered, as determined at step 306, a composite image is formed by assembling the images generated for the different viewpoints.

Typically, when the composite image is formed, only a portion of each rendered image is used while the remaining portions of each rendered image may be discarded because there is only a fixed number of pixels in the display. For example, where a single stereo image is assembled from left and right rendered images, half of the pixels from the left images may be interleaved with half of the pixels from the right image to form the stereo image. The pixels from the left and right images which are not interleaved may be discarded.

A disadvantage of this algorithm is that it is inherently inefficient, as unused pixels from each rendered image are discarded when assembling the composite image. As a simple example, assuming a single view stereo image is generated, one half of the pixels for each image will be discarded. The inefficiency increases proportionally as multiple views are supported, as a smaller percentage of display space is allocated to each view and a corresponding fewer pixels for each rendered image are used. Further inefficiencies result from the fact that the scene data must be accessed for the processing pass for each image. Often transferring large amounts of data into a CPU or GPU for such processing represents a significant bottleneck.

Accordingly, what is needed is an improved technique for generating images for auto-stereo displays.

SUMMARY OF THE INVENTION

Embodiments of the present invention provide techniques for generating images for autostereo displays.

One embodiment provides a method for generating a composite image of a scene as viewed from multiple points of view for display on an auto-stereo display comprising a plurality of pixels. The method generally includes fetching at least a portion of the scene, generating, via a ray tracing algorithm, color values for a first subset of the pixels allocated to a first one of the points of view, and generating, via a ray tracing algorithm, color values for a second subset of the pixels allocated to a second one of the points of view without generating color values for all of the pixels of the display. The color values generated for the first and second subset of the pixels form a composite image.

Another embodiment provides a method for generating a composite image of a scene for display on a display device having a resolution related to a number of pixels. The method generally includes assigning a different subset of pixels of the display device to each of a plurality of points of view from which the scene may be viewed. For each point of view, a corresponding image is generated by calculating color values for the corresponding subset of pixels. The images for each point of view are assembled to create the composite image.

Another embodiment provides a system generally including one or more processing devices, memory for storing data representing a three dimensional scene, and an image generation component. The image generation component is executable by one or more of the processing devices to generate a composite image for display on a display device by assigning a different subset of pixels of the display device to each of a plurality of points of view from which the scene may be viewed, and for each point of view, generating color values for the corresponding subset of pixels using a ray tracing algorithm.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 2A and 2B illustrate exemplary autostereo display techniques, in accordance with the prior art.

DETAILED DESCRIPTION

Embodiments of the present invention generally provide methods and apparatus for generating images for auto-stereo displays. For some embodiments, ray tracing algorithms may be utilized to efficiently generate a composite image corresponding to multiple views. Because ray tracing is done on a per pixel basis, it is possible to generate pixel values for only those pixels that will be allocated to a particular image view. Thus, by tracing rays from a viewpoint only through those pixels allocated to displaying images corresponding to that viewpoint, a composite image may be generated without discarding pixel data.

Embodiments of the present invention will be described below with reference to ray tracing to generate color values for a limited number of pixels values associated with a particular field of view. As used herein, the term ray tracing generally refers to any type of algorithm that traces the paths of rays, regardless of the path direction, whether "forward" to a viewer's eye from scene objects or "backwards" from a viewer's eyes to scene objects (sometimes referred to as "ray casting"). However, those skilled in the art will recognize that various other image generation techniques may also be adapted to generate color values for a limited number of pixel values as described herein. Thus, the use of ray tracing to generate pixel values for only those pixels used in a particular image view should be understood as a particular, but not limiting, example.

Further, while embodiments will be described with reference to operations performed by executing code (e.g., by a CPU and/or GPU), it may also be possible to perform similar operations with dedicated or modified hardware. Further, those skilled in the art will recognize that the techniques described herein may be used to advantage in any type of system in which multiple views are displayed to a user including, but not limited to, a single user stereo display, in which a single stereo pair is presented to the user or multiple views are displayed to one or more users (e.g., multiple views simultaneously, or a single view from a viewpoint determined based on head tracking). In addition to composite stereo images, the techniques may also be applied to generate composite images to achieve other effects, such as watermarking or any other type of graphical effect.

An Exemplary System

Figure 4:
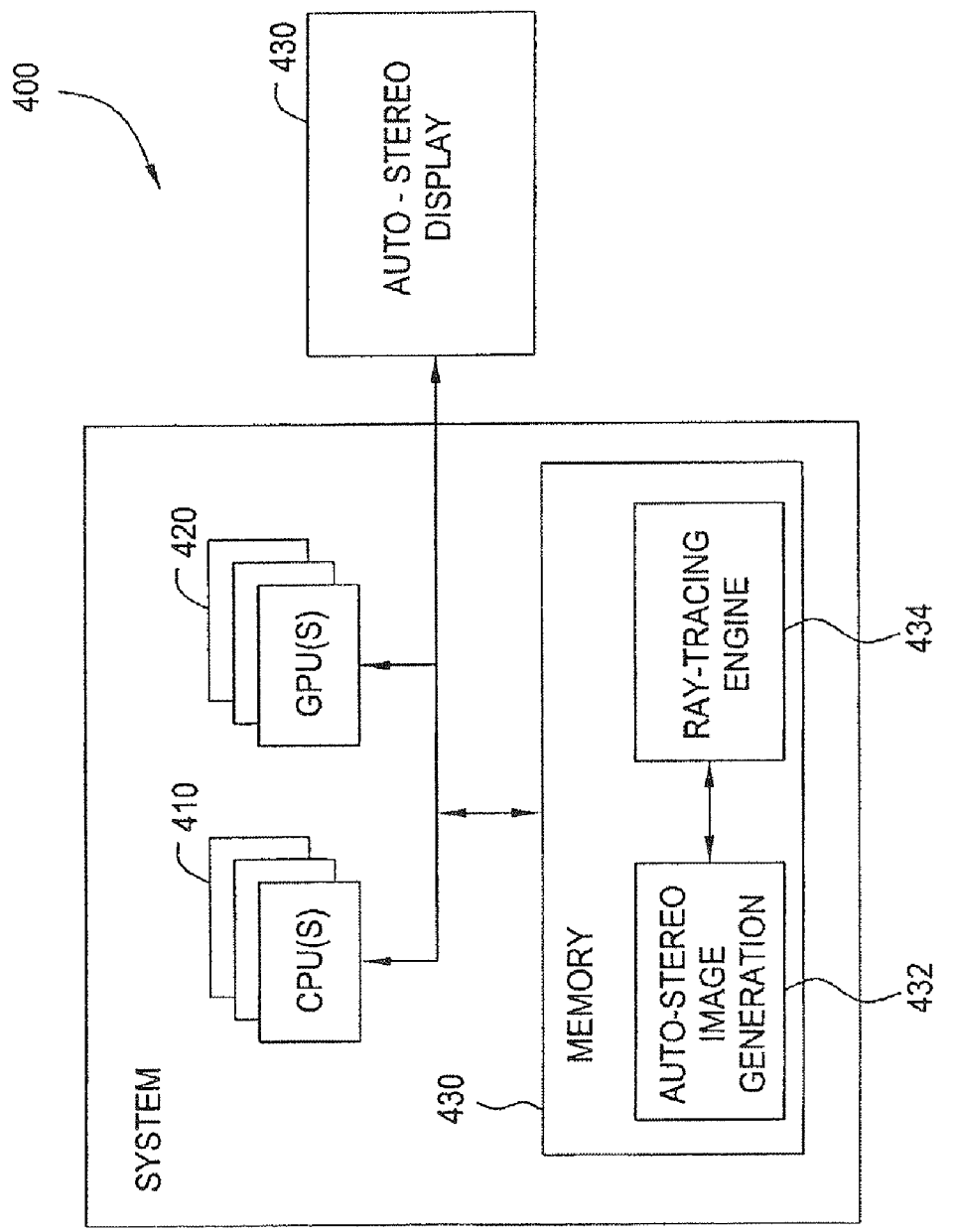
FIG. 4 illustrates an exemplary system in which embodiments of the present invention may be utilized.

FIG. 4 illustrates an exemplary system 400 which may be utilized to generate images for display on an auto-stereo display 430. While not shown, the auto-stereo display 430 may include any suitable mechanism to present the proper image to the left and right eye of each of one or more viewers, such as a set of lenses, a barrier mask, or shuttering mechanism. Further, for some embodiments, a head tracking device may be utilized to track the position of one or more users, in order to determine from which fields of view separate images (for use in a composite image) should be generated. In other words, the head tracking device may provide feedback to one or more CPUs 410 and/or GPUs 420 for use in selecting one or more fields of view, as described in further detail below.

The CPUs 410 and/or GPUs 420 may be configured to perform image generation as described herein. For some embodiments, one or more of the CPUs 410 and/or GPUs 420 may be configured to perform operations in response to executing auto-stereo image generation code 432 utilizing a ray-tracing engine 434, both stored in memory 430. For other embodiments, the operations described herein may be performed by specialized hardware, which may be separate from or integrated with the CPUs 410 and/or GPUs 420.

Figure 5:
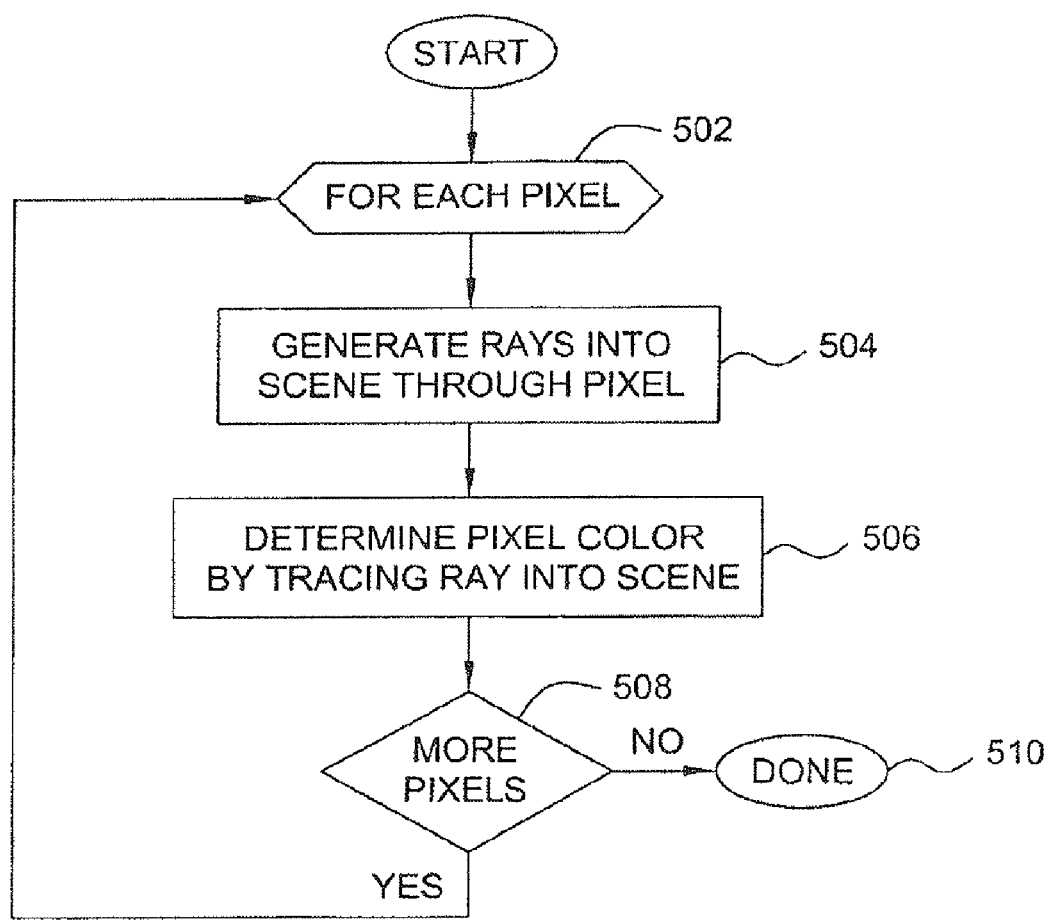
FIG. 5 illustrates exemplary operations for ray tracing that may be performed in accordance with embodiments of the present invention.

FIG. 5 illustrates exemplary ray tracing operations 500, for example, similar to those that may be performed by the ray-tracing engine 434. The operations 500 of FIG. 5, and concepts of ray tracing in general, may be understood with reference to FIGS. 6A-6C, which illustrate a screen of pixels 610 on which images of a simplified scene containing an object 110 are to be rendered. As illustrated, a loop of operations is entered, at step 502, to calculate color values for each pixel or region of pixels to calculate pixel values. At step 504, a ray traveling to/from a viewpoint through a current pixel is generated. At step 506, the pixel color is determined by tracing the path of the ray through the pixel into the scene. These steps are repeated until all pixels have been processed, as determined at step 508.

Figure 6A:
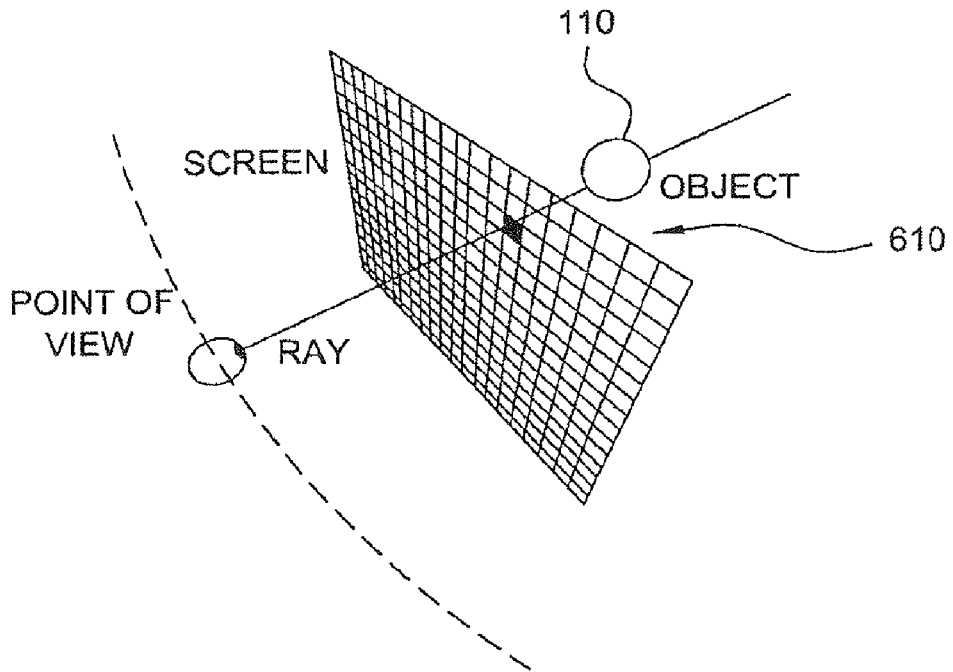
FIGS. 6A-6C illustrate graphically the concepts of ray tracing from a single viewpoint and multiple viewpoints, in accordance with one embodiment of the present invention.
Figure 6B:
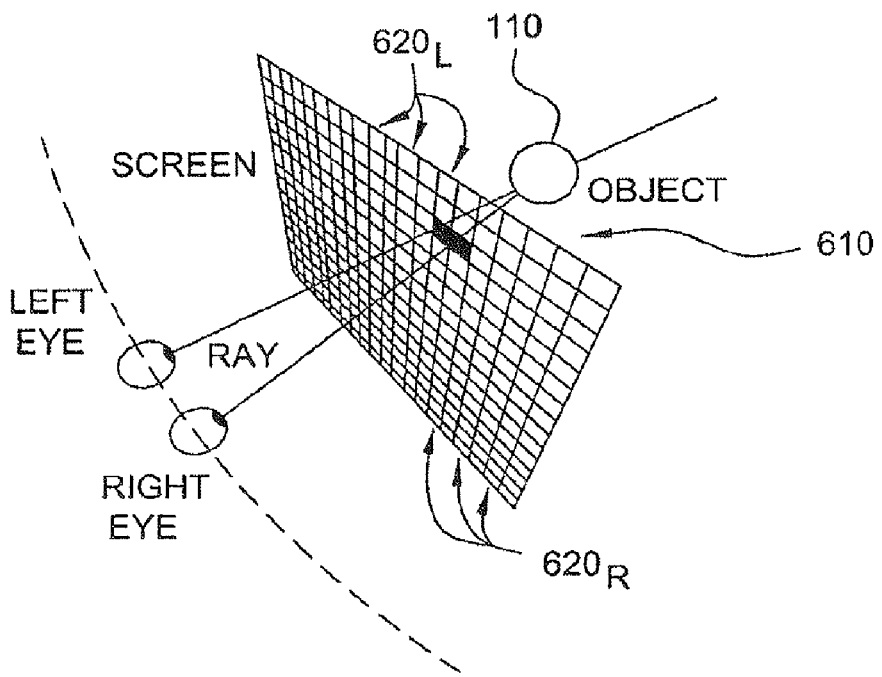

As illustrated in FIG. 6A, a screen of pixels may be conceptualized as a mesh (or screen door), with each ray traveling from a viewpoint through the pixels. As is known in the art, the pixel color may be determined by following the path of the ray to see which object, if any, is intersected. If no object is intersected, the pixel may be "painted" a background color. If objects are intersected, the color of the pixel may be determined by evaluating ray properties, such as reflection, transparency, and the effects of shadows, often using recursion.

In a conventional display system, a set of rays may be generated that originate from a single point of view and travel through each screen pixel. Each of these rays may be traced into the scene to generate a single "mono" view of the scene. To generate a stereo image, this process may be repeated to generate an image of the scene from a different point of view. These images may be merged to generate a composite stereo image. However, as previously described with reference to the method described above utilizing rasterization techniques, this approach is inefficient, as a large number of pixel values would be wasted.

In an effort to increase efficiency, embodiments of the present invention may generate a stereo image in a manner that reduces or eliminates a number of pixel values discarded. One technique may take advantage of the pixel-by-pixel nature of ray tracing to generate only pixel values that will actually be used in the final stereo image. For example, referring to FIG. 6B, ray tracing may be performed from two different points of view that correspond to left and right eye locations, to generate a single stereo image.

Different portions of the screen pixels may be allocated to each the left and right view images. For example, vertical rows 620L of pixels may be allocated to the left eye image, while interleaved vertical rows 620R of pixels may be allocated to the right eye image. Rather than generate an entire set of rays originating from the left eye viewpoint traveling through all screen pixels, a limited set of rays originating from the left eye viewpoint and traveling through only the vertical rows 620L allocated to the left eye image may be generated. In a similar manner, a limited set of rays originating from the right eye viewpoint and traveling through only the vertical rows 620R allocated to the right eye image may be generated to produce the right eye image pixel values.

Figure 6C:
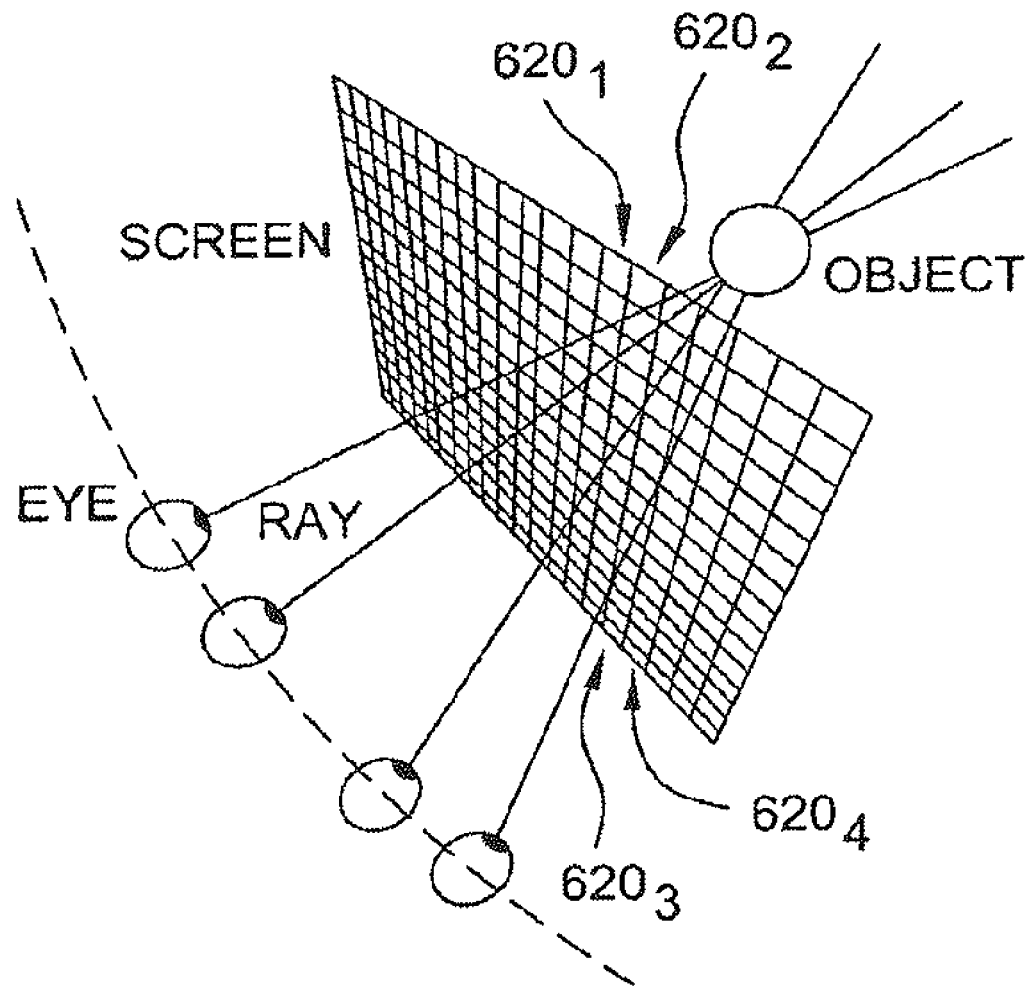

As a result, the left and right eye image pixel values used in the final composite image may be generated without the processing overhead conventionally wasted on generating pixel values that would not be used in the composite image. In effect, a low resolution image for each image is generated. For example, assuming half of the pixels are allocated to each image, the resolution of each left and right image may be half that of the final composite stereo image. As illustrated in FIG. 6C, however, this technique may be extended to multi-view stereo displays, with even greater gains in efficiency over conventional techniques. In the illustrated example, vertical rows $620_1$ and $620_2$ are dedicated to the left and right eye images of a first viewer, while vertical rows $620_3$ and $620_4$ are dedicated to the left and right eye images of a second viewer. With 25% of the screen area dedicated to each point of view, the number of color values generated is reduced by 75% when compared to conventional image generation techniques. As a more extreme example, assuming a display with five stereo pairs (ten total points of view) and 10% of the screen area dedicated to each point of view, generating color values for only those pixels allocated to the particular point of view may reduce the number of color values generated by 90% when compared to conventional image generation techniques.

Figure 7:
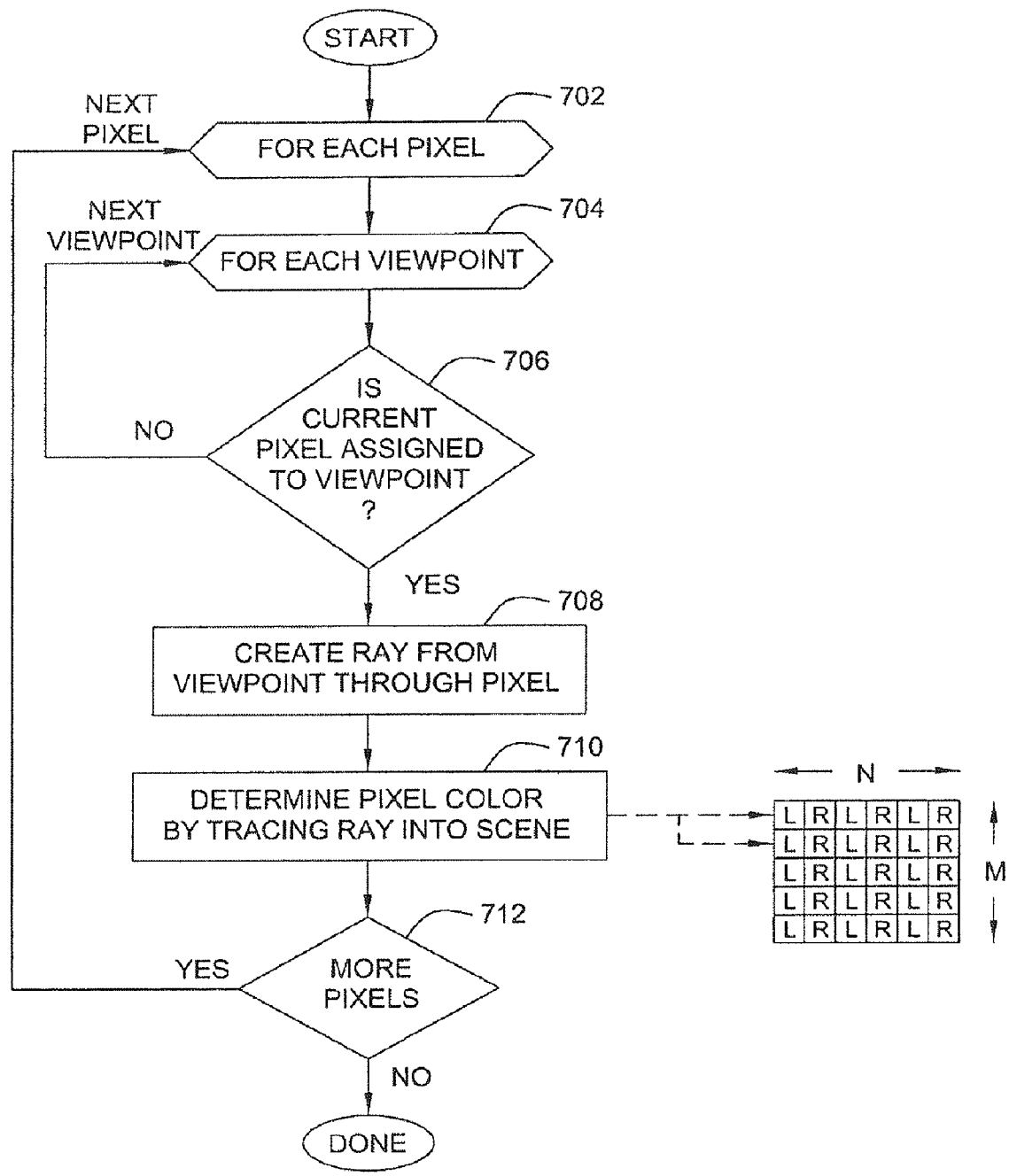
FIG. 7 illustrates exemplary operations for generating images for an auto-stereo display, in accordance with one embodiment of the present invention.

FIG. 7 illustrates exemplary operations 700 for generating stereo images in accordance with embodiments of the present invention. At step 702, an outer loop of operations to be performed for each pixel is entered, while at step 704, an inner loop of operations to be performed for each viewpoint is entered. At step 706, a determination is made as to whether the current pixel is assigned to a current viewpoint. If not, steps 704-706 are repeated until the corresponding viewpoint to which the pixel is assigned is reached. Once the viewpoint to which the current pixel is assigned is reached, a ray from the viewpoint into the scene through the current pixel is generated, at step 708, and a pixel value is determined by tracing this ray, at step 710. Once these operations have been performed for each pixel, as determined at step 712, all pixel values for use in the composite image will have been generated.

Figure 1A:
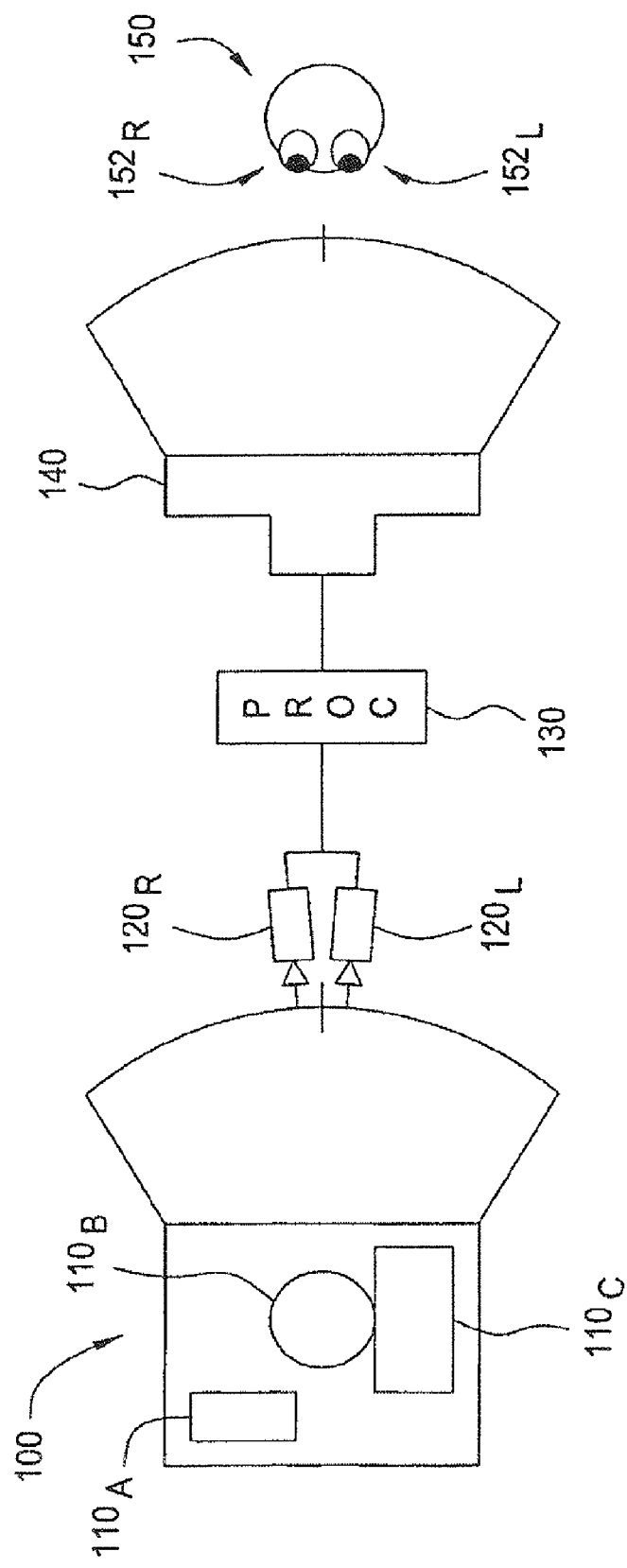
FIGS. 1A-1B illustrate an exemplary scene and an autostereo display for displaying the same.
Figure 1B:
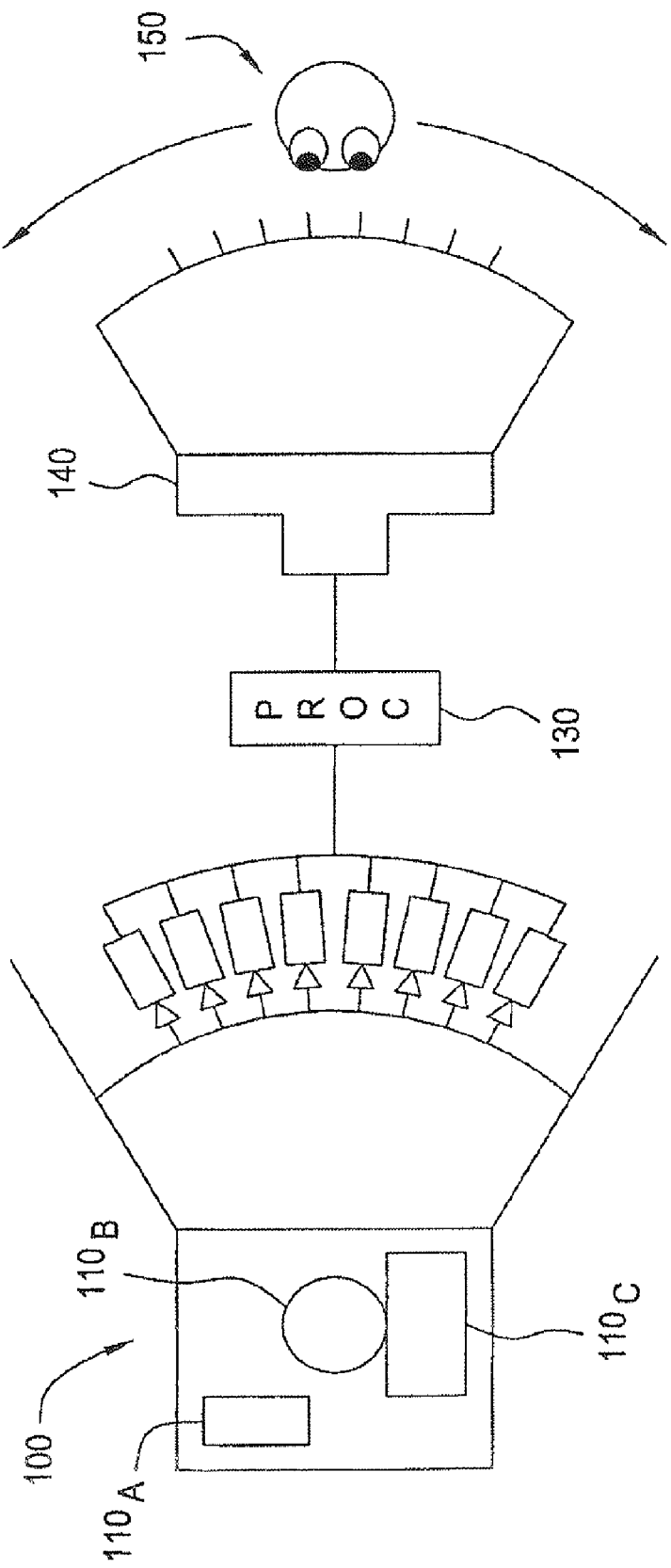
Figure 3:
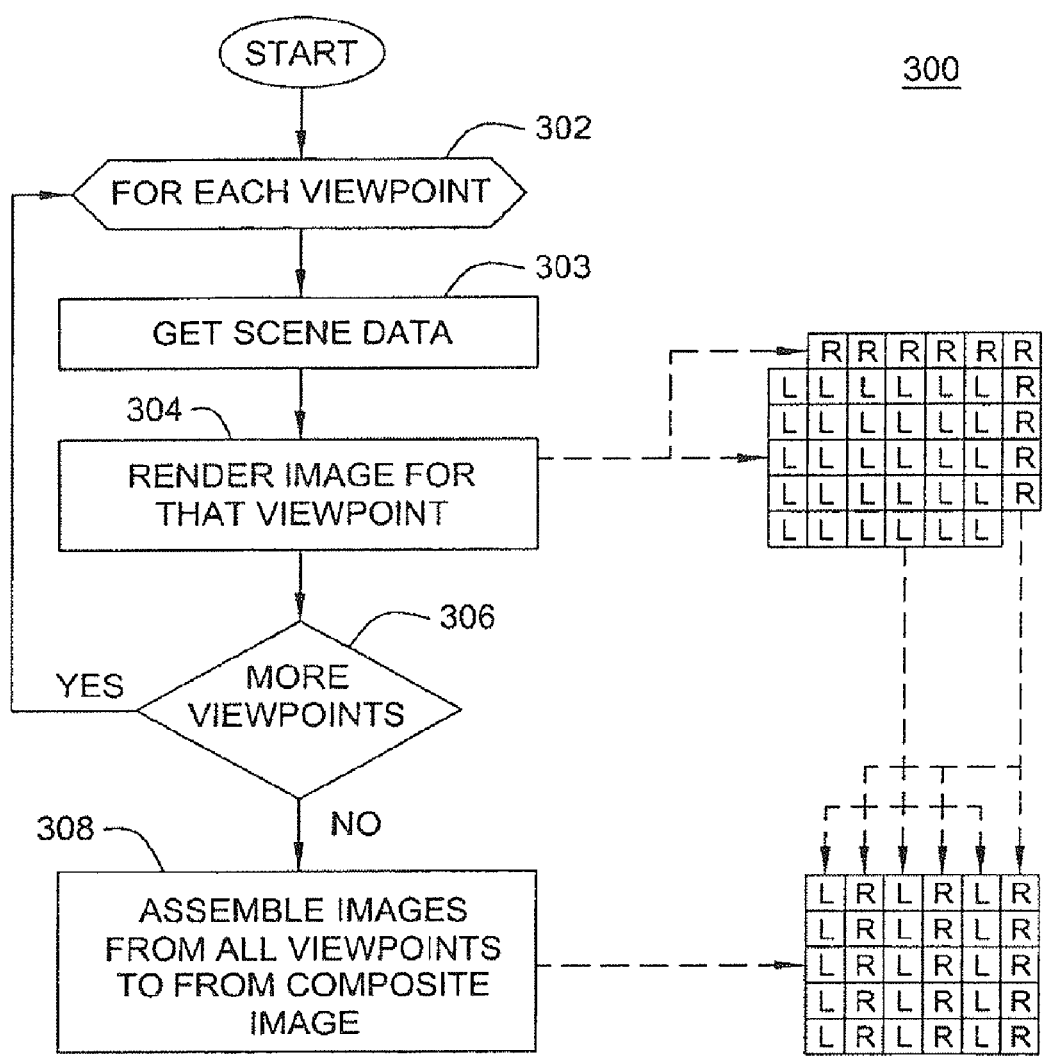
FIG. 3 illustrates exemplary operations for generating autostereo images, in accordance with the prior art.

Of note is that the outer loop of operations is performed per-pixel rather than per-viewpoint. As a result, only a single processing pass through the scene data is required. In contrast, conventional techniques, such as that illustrated in FIG. 3, requires multiple passes through the image data. Because the transfer of this data (e.g., from main memory to a processor cache) is often a bottleneck in the processing, the techniques described herein may result in substantial performance by taking advantage of locality of reference in memory accesses and, thus reducing overall access latency. In other words, by performing all the necessary pixel value calculations on a pixel (or set of pixels) in a single processing pass, the latency associated with re-fetching the corresponding scene data for additional processing passes may be eliminated. This reduction in access latency may contribute to significant gains in overall performance.

Figure 8:
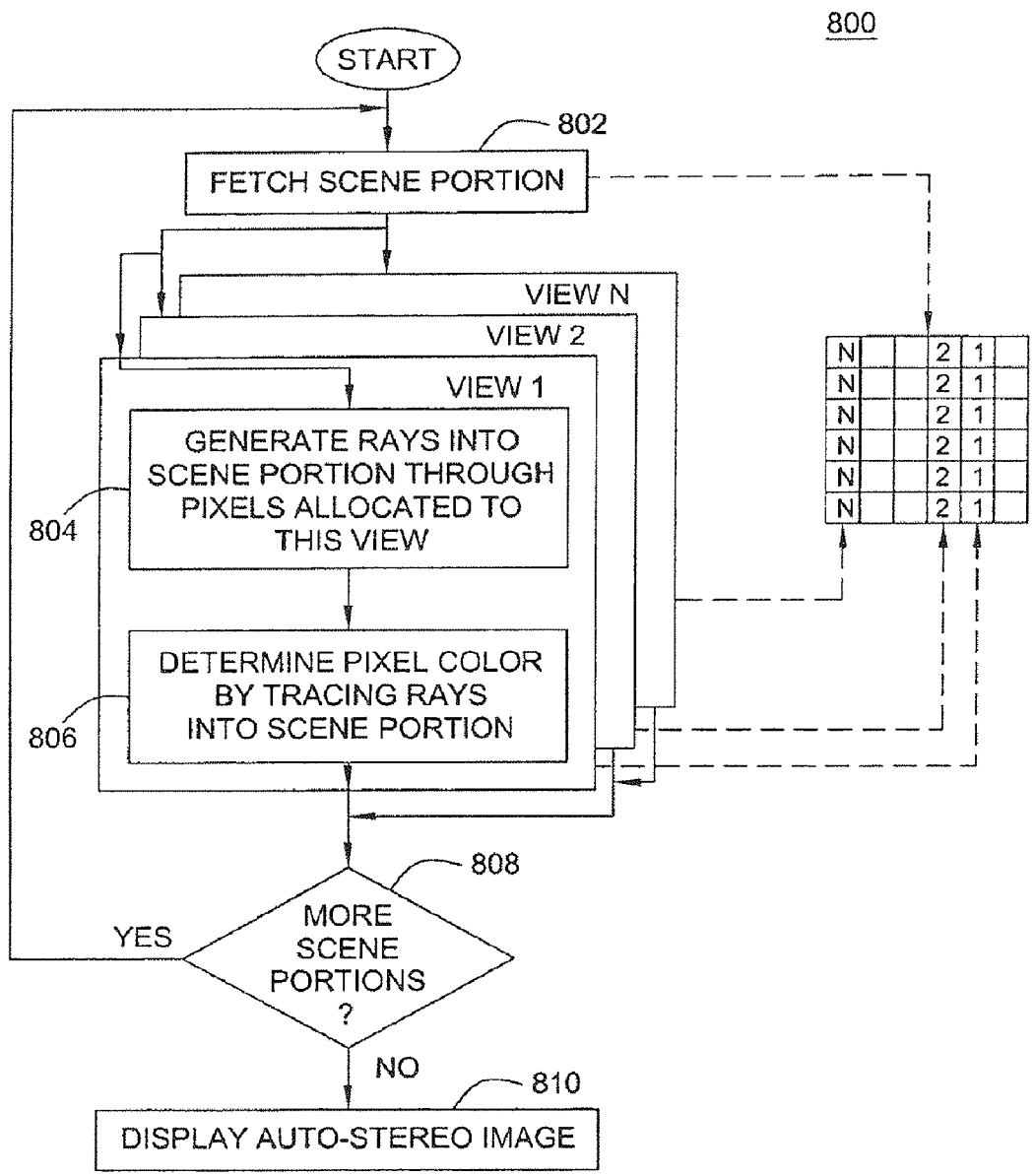
FIG. 8 illustrates exemplary operations for generating images for an auto-stereo display, in accordance with another embodiment of the present invention.

As illustrated by the exemplary operations 800 shown in FIG. 8, for some embodiments, the pixel values for the multiple views of a composite image may be generated in parallel. For example, a scene portion may be fetched from memory, at step 802. For each of multiple views (1 to N), a set of rays may be generated into that scene portion through pixels allocated to the view, at step 804, and the color values for those pixels determined by tracing those rays, at step 806. As illustrated, each view may be allocated a portion (e.g., vertical rows) of pixels in the display screen. These operations may be repeated until the pixel values have been generated for each scene portion, as determined at step 808. At step 810, the composite image, already assembled, may be displayed. For some embodiments, horizontal rows may be allocated in a similar manner, for example, to generate different views for users at different elevations (such as viewers seated in different rows of a theater).

Depending on the embodiment, the pixel values for each view may be generated in parallel by a number of different techniques. For example, referring back to FIG. 4, the pixel values for each view may be generated by multiple processors of a common CPU, multiple CPUs, multiple processors of a common GPU, multiple processors of multiple GPUs, or multiple processing threads of any of these. In either case, for some embodiments, the pixel values for the multiple views may be written to a common memory (e.g., frame buffer), from which the entire composite view may be output to a display device. For some embodiments, the pixel values for each view may be output to some separate type of memory location, and the composite view may be quickly assembled therefrom.

Those skilled in the art will recognize that the techniques described herein may be applied to advantage in a wide variety of multi-view displays, for example, including but not limited to, single view stereo displays and multi-view stereo displays. Known techniques, such as head tracking may be utilized to determine a "head position" for a single user or multiple users, and fields of view to generate corresponding stereo-pairs may be determined accordingly.

CONCLUSION

In any case, by generating, for each view, color values for only those pixels assigned to the view, overall processing overhead may be greatly reduced. Further, by calculating pixel values for the images for all points of view while a corresponding scene image region is cached, additional delays encountered when "re-fetching" the same image region for a subsequent pass may be avoided.

While the foregoing is directed to embodiments of the present invention, other and further embodiments of the invention may be devised without departing from the basic scope thereof, and the scope thereof is determined by the claims that follow.

What is claimed is:

1. A method comprising:
   generating, via a ray tracing algorithm, color values for a first subset of pixels of a display device allocated to a first viewpoint, the color values for the first subset of pixels based on a representation of a scene as seen from the first viewpoint;
   generating, via the ray tracing algorithm, color values for a second subset of pixels of the display device allocated to a second viewpoint, the color values for the second subset of pixels based on a representation of the scene as seen from the second viewpoint, wherein the first and second subset of pixels of the display device comprise mutually exclusive pixels of the display device; and
   forming a composite image of the scene based on the color values generated for the first and second subset of pixels of the display device.

2. The method of claim 1, further comprising:
   fetching at least a portion of the scene by transferring a portion of the scene stored in memory to a processor cache.

3. The method of claim 1, wherein:
   the first subset of pixels comprises a first set of vertical rows of pixels of the display device; and
   the second subset of pixels comprises a second set of vertical rows of pixels of the display device interleaved with the first set of vertical rows of pixels.

4. The method of claim 1, wherein the first and second viewpoints correspond to the left and right eyes of a viewer.

5. The method of claim 1, wherein the color values for the first and second subsets of pixels are generated in parallel.

6. A system, comprising:
   one or more processing devices;
   memory for storing data representing a scene; and
   an image generation component executable by one or more of the processing devices to generate a composite image of the scene for display on a display device by:
      assigning mutually-exclusive subsets of pixels of the display device to corresponding viewpoints of the scene; and
      generating color values for the corresponding subset of pixels of the viewpoints using a ray tracing algorithm,
      wherein the composite image of the scene is based on the color values generated for the viewpoints.

7. The system of claim 6, wherein the one or more processing devices comprises one or more graphics processing devices.

8. The system of claim 6, wherein the viewpoints comprise at least four viewpoints, collectively forming at least two stereo image pairs.

9. The system of claim 6, wherein the subsets of pixels comprise mutually-exclusive sets of columns of pixels of the display device.

10. The system of claim 6, wherein the image generation component is configured to generate the composite image is as the color values for the subsets of pixels are generated.

11. The system of claim 6, wherein the image generation component is configured to generate color values for the subsets of pixels in parallel.

12. The system of claim 6, wherein the image generation component is configured to:
    fetch a portion of the scene from the memory into cache of one or more of the processors prior to the generation of the color values,
    wherein color values for a plurality of the subsets of pixels are generated while the portion of the scene is in the cache.

13. The system of claim 6, wherein the subsets of pixels comprise mutually-exclusive sets of columns of pixels of the display device.

14. A non-transitory computer-readable medium having computer-executable instructions stored thereon that, when executed by a computing device, cause the computing device to perform a method comprising:
    generating, via a ray tracing algorithm, color values for a first subset of pixels of a display device allocated to a first viewpoint, the color values for the first subset of pixels based on a representation of a scene as seen from the first viewpoint;
    generating, via the ray tracing algorithm, color values for a second subset of pixels of the display device allocated to a second viewpoint, the color values for the second subset of pixels based on a representation of the scene as seen from the second viewpoint, wherein the first and second subset of pixels of the display device comprise mutually exclusive pixels of the display device; and
    forming a composite image of the scene based on the color values generated for the first and second subset of pixels of the display device.

15. The computer-readable medium of claim 14, the method further comprising:
    fetching at least a portion of the scene by transferring a portion of the scene stored in memory to a processor cache.

16. The computer-readable medium of claim 14, wherein:
    the first subset of pixels comprises a first set of vertical rows of pixels of the display device; and
    the second subset of pixels comprises a second set of vertical rows of pixels of the display device interleaved with the first set of vertical rows of pixels.

17. The computer-readable medium of claim 14, wherein the first and second viewpoints correspond to the left and right eyes of a viewer.

18. The computer-readable medium of claim 14, wherein the color values for the first and second subsets of pixels are generated in parallel.

19. A method comprising:
    assigning mutually-exclusive subsets of pixels of a display device to corresponding viewpoints of a scene;
    generating color values for the corresponding subset of pixels of the viewpoints using a ray tracing algorithm; and
    providing a composite image of the scene to the display device based on the color values generated for the viewpoints.

20. The method of claim 19, wherein the viewpoints comprise at least four viewpoints, collectively forming at least two stereo image pairs.

* * * * *

UNITED STATES PATENT AND TRADEMARK OFFICE
CERTIFICATE OF CORRECTION

PATENT NO.         : 7,925,078 B2                                        Page 1 of 1
APPLICATION NO.    : 12/752973
DATED              : April 12, 2011
INVENTOR(S)        : Charles C. Rhodes It is certified that error appears in the above-identified patent and that said Letters Patent is hereby corrected as shown below:

Column 8, line 5, replace "composite image is as" with --composite image as--.

Signed and Sealed this
Twenty-eighth Day of June, 2011

David J. Kappos
*Director of the United States Patent and Trademark Office*